US009579971B2

(12) United States Patent
Koishikawa et al.

(10) Patent No.: US 9,579,971 B2
(45) Date of Patent: Feb. 28, 2017

(54) FUEL CAP PROVIDED WITH BREATHER MECHANISM

(71) Applicant: HONDA MOTOR CO., LTD., Tokyo (JP)

(72) Inventors: Takuma Koishikawa, Wako (JP); Takeshi Uemae, Wako (JP); Takashi Toriki, Wako (JP); Yoji Fukui, Wako (JP); Takumi Sakamoto, Wako (JP); Takeshi Shimura, Wako (JP); Shinji Kobayashi, Wako (JP); Satoshi Okayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 14/452,830

(22) Filed: Aug. 6, 2014

(65) Prior Publication Data

US 2015/0041466 A1    Feb. 12, 2015

(30) Foreign Application Priority Data

Aug. 8, 2013   (JP) ................................ 2013-165106

(51) Int. Cl.
*B60K 15/04* (2006.01)
*B65D 51/16* (2006.01)
*B62J 35/00* (2006.01)

(52) U.S. Cl.
CPC ........... *B60K 15/0406* (2013.01); *B62J 35/00* (2013.01); *B65D 51/1638* (2013.01); *B65D 51/1644* (2013.01)

(58) Field of Classification Search
CPC .... B60K 15/04; B60K 15/0406; B65D 51/16; B65D 51/1644; B65D 51/1638; B62J 35/00
See application file for complete search history.

(56) References Cited

U.S. PATENT DOCUMENTS

| 7,578,405 | B2* | 8/2009 | Hagano | ............ B60K 15/03519 220/203.23 |
| 2004/0055664 | A1* | 3/2004 | Horvath | ................. B60K 15/04 141/98 |
| 2011/0083772 | A1* | 4/2011 | Whelan | .............. F02M 37/0076 141/369 |

FOREIGN PATENT DOCUMENTS

| JP | UM-Y-37-031905 Y | 12/1962 |
| JP | UM-A-58-76428 A | 5/1983 |
| JP | 05-246367 | 9/1993 |
| JP | 05-305888 A | 11/1993 |
| JP | 07-246972 A | 9/1995 |
| JP | 2005-81862 A | 3/2005 |

* cited by examiner

*Primary Examiner* — Andrew Perreault
(74) *Attorney, Agent, or Firm* — Squire Patton Boggs (US) LLP

(57) ABSTRACT

In a fuel cap provided with a breather mechanism, a cap openably and closably covers a fuel filler of a fuel tank. The cap includes a breather passage for communication between the inside and the outside of the fuel tank. The breather passage is provided with a breather valve mechanism and a resonator chamber as a silencing mechanism. The breather mechanism is a valve having a spring capable of retaining a pressure within the fuel tank up to a predetermined pressure.

18 Claims, 12 Drawing Sheets

FUEL CAP PROVIDED WITH BREATHER MECHANISM

BACKGROUND

Field

The present invention relates to an improvement in a fuel cap.

Description of the Related Art

Of fuel caps for covering a fuel filler hole, a fuel cap provided with a breather mechanism for providing ventilation between the inside of a fuel tank and the atmosphere is known (see FIG. 4 of Japanese Patent Laid-Open No. Hei 05-246367 (Patent Document 1), for example).

As shown in FIG. 4 of Patent Document 1, a fuel cap (6) provided with a breather mechanism (a number in parentheses represents a reference symbol described in Patent Document 1; the same applies hereinafter) has a breather hole (20) and a first breather valve (13) disposed in the breather hole (20). The breather hole (20) is open until a fuel tank is inclined from a horizontal attitude to a predetermined angle. When the fuel tank is inclined to the predetermined angle or more, the first breather valve (13) closes the breather hole (20) to block communication between the inside of the fuel tank and the atmosphere.

The fuel cap (6) provided with the breather mechanism also has an exhaust hole (24) and a second breather valve (14) disposed in the exhaust hole (24). The second breather valve (14) exhausts a fuel vapor when an internal pressure of the fuel tank becomes a predetermined value or more.

Patent Document 1 describes an invention whose object is to eliminate a squeaking phenomenon. Specifically, an exhaust sound, or a so-called squeaking occurs when the second breather valve (14) is changed from a closed state to an opened state. In Patent Document 1, the first breather valve (13) normally remains open, so that the squeaking is not likely to occur.

However, the breather hole (20) is normally opened, so that a fuel vapor within the fuel tank is often released from the breather hole (20) into the atmosphere. Thus, there is room for an improvement in terms of a load on the environment.

SUMMARY

It is an object of the present invention to provide a technology that can prevent squeaking that occurs in a breather valve and a passage in a fuel cap provided with the breather valve, reduce a load on the environment, and also reduce cost.

According to a first embodiment of the invention, there is provided a fuel cap provided with a breather mechanism, a cap openably and closably covering a fuel filler of a fuel tank. The cap includes a breather passage for communication between an inside of the fuel tank and an atmosphere. A breather valve mechanism is a valve having a spring capable of retaining an internal pressure of the fuel tank up to a predetermined pressure, and the breather passage is provided with the breather valve mechanism and a resonator chamber as a silencing mechanism.

According to another embodiment of the invention, the resonator chamber is disposed on a side closer to an opening to the atmosphere than to the valve in the breather passage.

According to another embodiment of the invention, the fuel cap provided with the breather mechanism is swingably supported on the fuel tank via a shaft member. The shaft member overlaps with the resonator chamber in a height direction.

According to another embodiment of the invention, the fuel cap provided with the breather mechanism is formed of a lower body and an upper body attached onto the lower body. The breather passage before branching into the resonator chamber is formed in the lower body below the resonator chamber. The resonator chamber and a branching portion between the resonator chamber and the breather passage are formed at a same height as the resonator chamber in the upper body. The resonator chamber and the breather passage before the branching are formed so as to be vertically separated from each other with a seal member as a boundary.

According to another embodiment of the invention, the breather passage before branching and the breather passage after branching form a bypassing shape vertically bypassing at least one of a projecting portion formed on the seal member and a recessed portion.

According to another embodiment of the invention, the seal member has substantially a shape of a U as viewed in plan, and is attached to the upper body or the lower body at both ends in a vehicle width direction of the seal member.

According to another embodiment of the invention, the valve includes a positive pressure valve and a negative pressure valve. When the inside of the fuel tank has a positive pressure, the positive pressure valve is opened and the negative pressure valve is closed. When the inside of the fuel tank has a negative pressure, the positive pressure valve is closed and the negative pressure valve is opened.

According to another embodiment of the invention, a passage making a connection from the positive pressure valve to the breather passage is formed in an inclined shape.

According to another embodiment of the invention, a tip end of the valve has a shape of four to 12 vanes.

According to certain embodiments, the resonator chamber for eliminating squeaking that occurs when an air passes is provided to the breather passage. The squeaking that occurs in the breather valve mechanism when an air passes through the breather valve mechanism can be prevented by annexing the resonator chamber to the breather passage.

In addition, the breather valve mechanism is a valve having a spring capable of retaining up to a predetermined pressure. Such a breather valve mechanism retains the internal pressure of the fuel tank until the internal pressure of the fuel tank exceeds the predetermined pressure. This prevents an evaporated fuel within the fuel tank from being released to the outside of the fuel tank until the predetermined pressure is reached, so that an amount of evaporated fuel is suppressed. Hence, as compared with a fuel cap having a structure that normally allows the inside of the fuel tank to communicate with the atmosphere, the amount of evaporated fuel can be reduced greatly, and thus a load on the environment can be reduced.

As a result, a fuel cap provided with a breather valve mechanism is provided which can prevent squeaking that occurs in the breather valve mechanism and which can reduce a load on the environment.

According to certain embodiments, the resonator chamber is disposed on the side closer to the opening of the breather passage which opening is opened to the atmosphere than to the valve. Because the resonator chamber is disposed on the side closer to the opening to the atmosphere, a noise attendant on an intake or an exhaust is not likely to be emitted to the outside.

According to certain embodiments, the shaft member that swingably supports the fuel cap provided with the breather mechanism on the fuel tank overlaps with the resonator chamber in the height direction. Because the shaft member and the resonator chamber overlap with each other in the height direction, the height of the fuel cap provided with the breather mechanism can be suppressed. As a result, the fuel cap provided with the breather mechanism can be miniaturized.

According to certain embodiments, the breather passage before the branching and the resonator chamber are formed so as to be vertically separated from each other with the seal member as a boundary. Because the breather passage and the resonator chamber are formed so as to be vertically separated from each other by using the seal member, the shape of the breather passage can be made simple. Because the shape of the breather passage becomes simple, an increase in cost of the fuel cap provided with the breather mechanism can be suppressed.

According to certain embodiments, the breather passage before and after branching forms a bypassing shape vertically bypassing the projecting portion or the recessed portion. Because the breather passage is formed into the shape of a complex labyrinth by the projecting portion or the recessed portion, a silencing effect is obtained easily. In addition, because the projecting portion formed on the seal member or the recessed portion is used for the bypassing shape, the bypassing shape can be formed easily.

According to certain embodiments, the seal member is attached to the upper body or the lower body at both ends in the vehicle width direction of the seal member. When the seal member is attached at both ends of the seal member, the accuracy of attachment of the seal member is improved in the vehicle width direction as compared with a case where the seal member is attached at other than both ends of the seal member.

In addition, the breather passage can be lengthened by providing the breather passage along substantially the shape of the U of the seal member. When the breather passage is lengthened, a distance from the breather valve mechanism provided at one end of the breather passage to the atmosphere side opening can be correspondingly lengthened, so that squeaking can be made even less likely to occur.

According to certain embodiments, the valve includes the positive pressure valve and the negative pressure valve. When the positive pressure valve and the negative pressure valve are provided in the breather passage, squeaking becomes a major problem.

In certain embodiments, the positive pressure valve is provided in the breather passage to which the resonator chamber is annexed. When the fuel tank has a high internal pressure and thus the positive pressure valve is opened, a pressure wave emitted from the positive pressure valve resonates with a pressure wave emitted from the resonator chamber, whereby the occurrence of squeaking can be suppressed.

According to certain embodiments, the passage making a connection from the positive pressure valve to the breather passage is formed in an inclined shape. By forming this passage into an inclined shape, a sharp change in cross-sectional area from the positive pressure valve to the breather passage is reduced, so that the occurrence of squeaking can be prevented.

According to certain embodiments, the tip end of the valve has a shape of four to 12 vanes.

In a case where the tip end of the valve piece has a shape of fewer vanes, that is, less than four vanes, the valve is likely to be affected by a gas flowing through the passage. Similarly, also in a case where the tip end of the valve piece has a shape of more vanes, that is, 13 vanes or more, the valve is likely to be affected by a gas flowing through the passage. When the valve is likely to be affected by a gas, the valve itself is likely to vibrate.

In this respect, the tip end of the valve in the present invention can have a shape of four (4) to twelve (12) vanes. In this case, a force is equally applied to the valve along the axial direction of the valve. Thus, the attitude of the valve is stabilized, and therefore the valve itself is not likely to vibrate. That is, the vibration of the valve can be made less likely to occur by setting the number of vanes of the vane shape at four to twelve.

DETAILED DESCRIPTION

Figure 1:
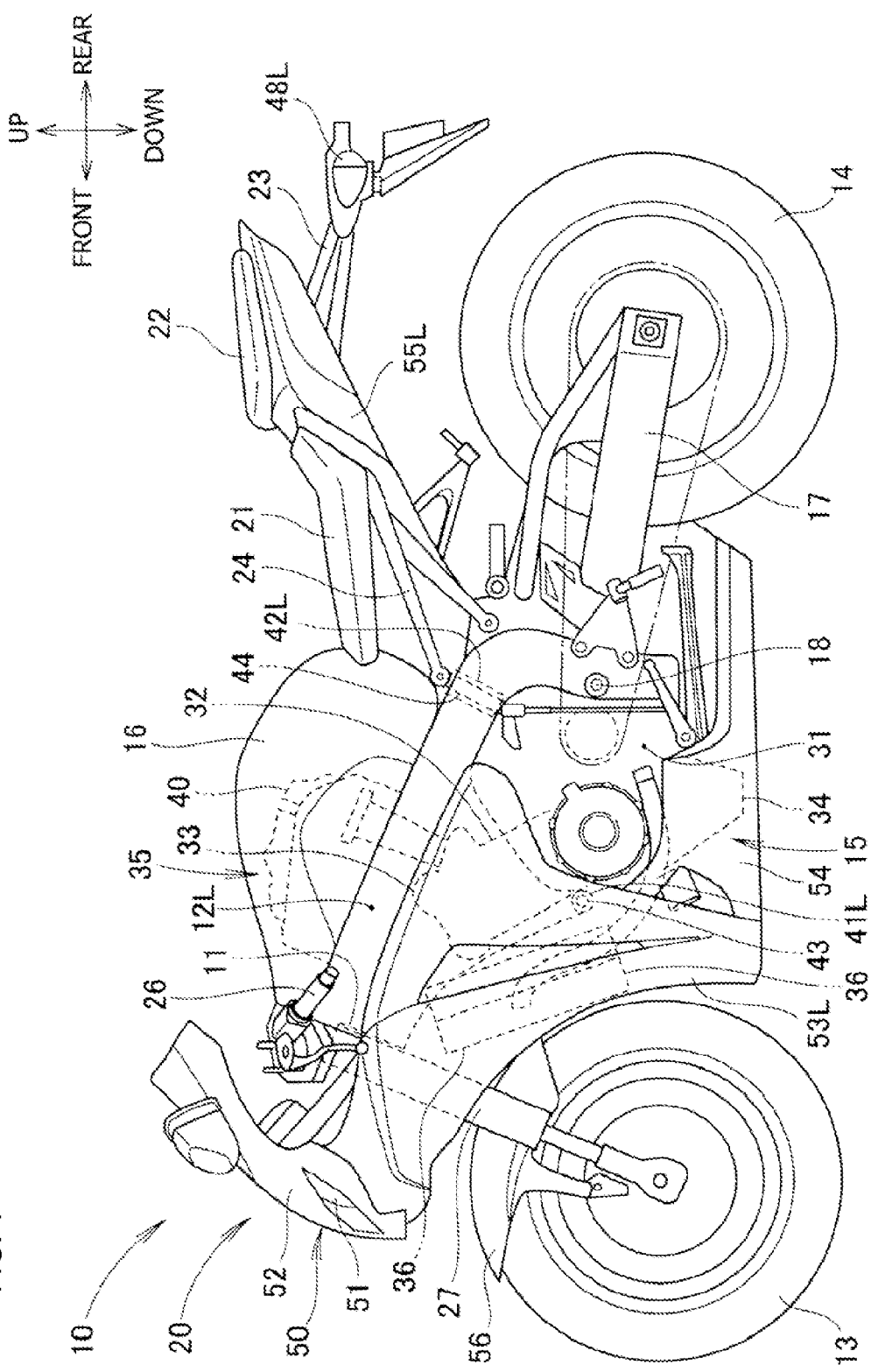
FIG. 1 is a left side view of a motorcycle according to the present invention.

Preferred embodiments of the present invention will hereinafter be described in detail. In the drawings and the embodiments, "up," "down," "front," "rear," "left," and "right" each indicate a direction as viewed from a driver who is riding on a motorcycle.

An embodiment of the present invention will be described on the basis of the drawings.

As shown in FIG. 1, a motorcycle 10 is a saddle riding type vehicle including a head pipe 11 for steerably supporting a front wheel 13, and a pair of left and right main frames 12L and 12R (only a reference symbol 12L on a near side in the figure is shown) branching from the head pipe 11 to a left and a right in a vehicle width direction and extending to the rear of the vehicle. The pair of left and right main frames 12L and 12R support an engine 15, and a fuel tank 16 is attached to the pair of left and right main frames 12L and 12R. A pivot portion 18 is formed in a rear portion of the pair of left and right main frames 12L and 12R to swingably support a rear swing arm 17 and a rear wheel 14. A rear frame 24 extends from an upper portion of the rear portion of the pair of left and right main frames 12L and 12R to the upper rear of the vehicle to support a driver seat 21, a passenger seat 22, and a license plate stay 23.

A vehicle body frame 20 includes the head pipe 11, the pair of left and right main frames 12L and 12R extending from the head pipe 11 to the left and the right in the rear, and the rear frame 24 extending from the pair of left and right main frames 12L and 12R to the rear. Handlebars 26 for steering the front wheel 13 are turnably attached to the head pipe 11. A front fork 27 extends integrally from the handlebars 26 obliquely to a lower front. The front wheel 13 is turnably attached to lower ends of the front fork 27.

The engine 15 includes a crankcase 31, a cylinder block 32, and a cylinder head 33 extending from the crankcase 31 to an upper front in this order. An oil pan 34 extends downward from a bottom portion of the crankcase 31, and an inlet system 35 is provided above the cylinder head 33. A radiator unit 36 is disposed in front of the cylinder block 32 and the cylinder head 33 and in the rear of the front wheel 13. An air cleaner 40, as a constituent element of the inlet system 35 of the engine 15, is provided between the pair of left and right main frames 12L and 12R.

Such an engine 15 is supported by lower ends 41L and 41R (only a reference symbol 41L on the near side in the figure is shown) of the left and right main frames 12L and 12R and rear ends 42L and 42R (only a reference symbol 42L on the near side in the figure is shown) of the left and right main frames 12L and 12R. Specifically, the lower ends 41L and 41R of the left and right main frames 12L and 12R support the engine 15 via first fastening bolts 43 and 43 (only a reference symbol 43 on the near side in the figure is shown) extending in the vehicle width direction. The rear ends 42L and 42R of the left and right main frames 12L and 12R support the engine 15 via second fastening bolts 44 and 44 (only a reference symbol 44 on the near side in the figure is shown) extending in parallel with an axial direction of the head pipe 11.

Description will next be made of a vehicle body cover 50. The vehicle body cover 50 includes an upper cowl 52 that covers the front portion of the vehicle and which is provided with a headlight 51. A left and a right front cowl 53L and 53R (only a reference symbol 53L on the near side in the figure is shown) extend downward and rearward from a lower end of the upper cowl 52 to cover sides of the engine 15. An under cowl 54 extends rearward from lower portions of the left and right front cowls 53L and 53R to cover a lower portion of the engine 15. Rear cowls 55L and 55R (only a reference symbol 55L on the near side in the figure is shown) are provided in a rear portion of the vehicle to cover sides of the passenger seat 22. The front fork 27 is provided with a front fender 56 for fending off mud from the front wheel 13.

Figure 2:
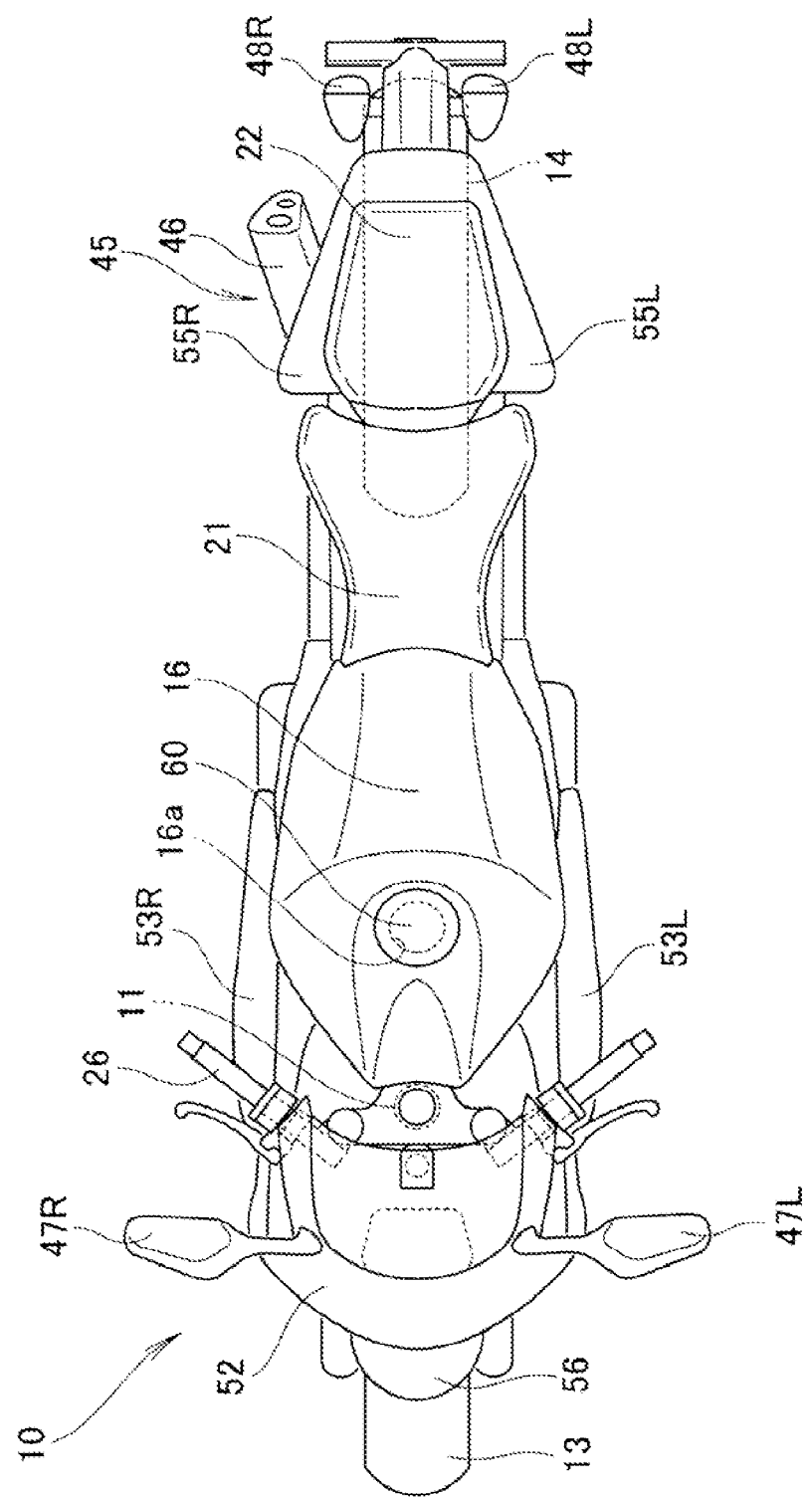
FIG. 2 is a plan view of the motorcycle according to the present invention.

As shown in FIG. 2, the upper cowl 52 is disposed in front of the head pipe 11. The fuel tank 16 is disposed in the rear of the head pipe 11. The driver seat 21 is disposed so as to be continuous with the rear of the fuel tank 16. The passenger seat 22 is disposed so as to be continuous with the rear of the driver seat 21. A cap 60 for openably and closably covering a fuel filler 16a of the fuel tank 16 (see FIG. 4) is provided on an upper surface of a front portion in a longitudinal direction of the fuel tank 16.

A muffler 46 provided for an exhaust system 45 of the engine 15 is disposed on the right side of the passenger seat 22. A left and a right rearview mirror 47L and 47R are attached to the upper cowl 52. A left and a right rear turn signal 48L and 48R are attached to the rear frame 24.

Figure 3:
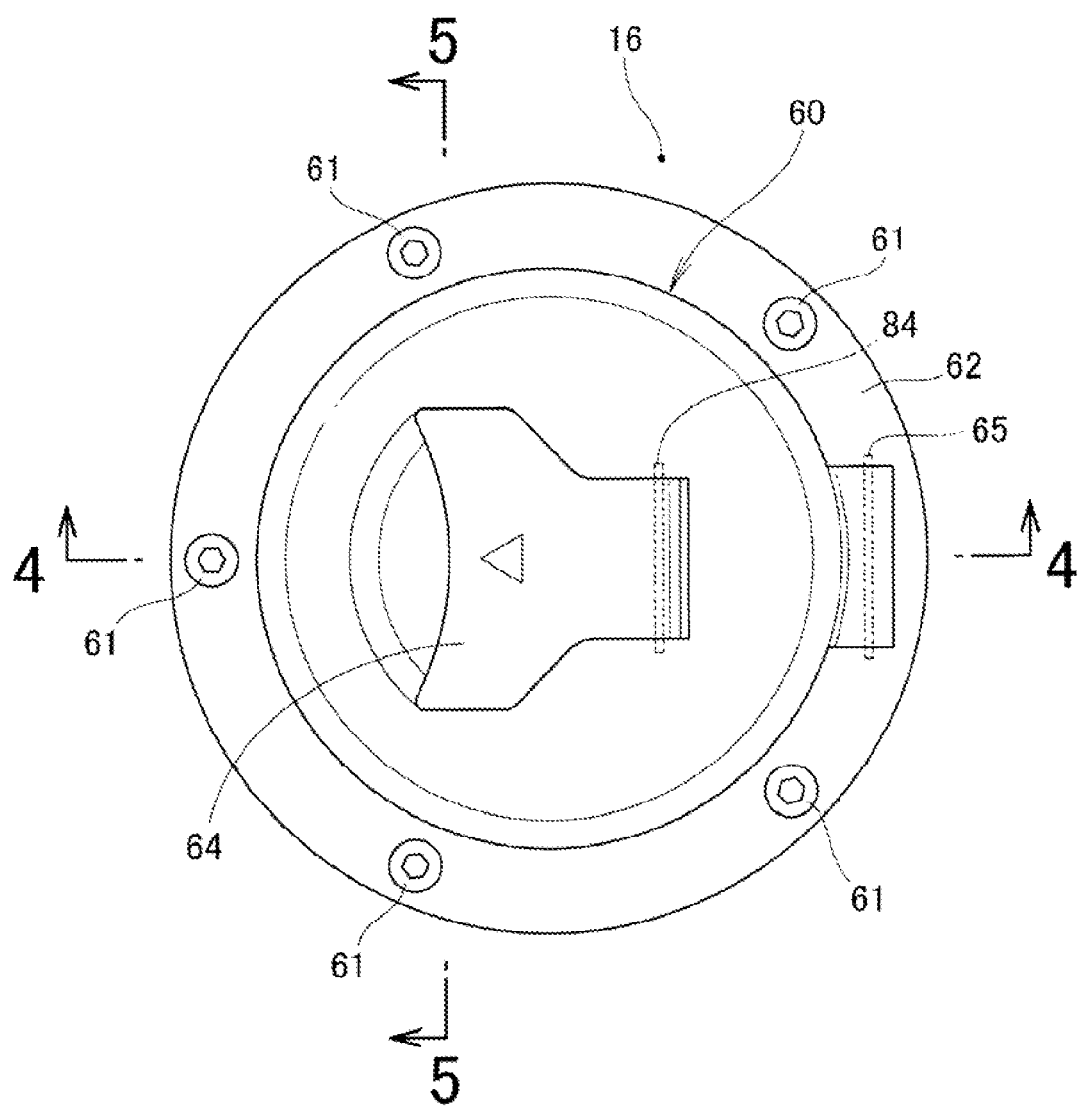
FIG. 3 is a plan view of assistance in explaining a fuel cap and a peripheral portion thereof in FIG. 2.

As shown in FIG. 3, a cap ring 62 surrounding the periphery of the fuel filler is attached to the upper surface of the fuel tank 16 via five hexagon socket head cap screws 61. The fuel cap 60 for openably and closably covering the fuel filler 16a (see FIG. 2), the fuel cap 60 having a circular shape as viewed in plan, is provided to the cap ring 62. A key cylinder cover 64 for openably and closably covering a keyhole of a key cylinder 63 (see FIG. 4) is provided in a center of the upper surface of the fuel cap 60.

Figure 4:
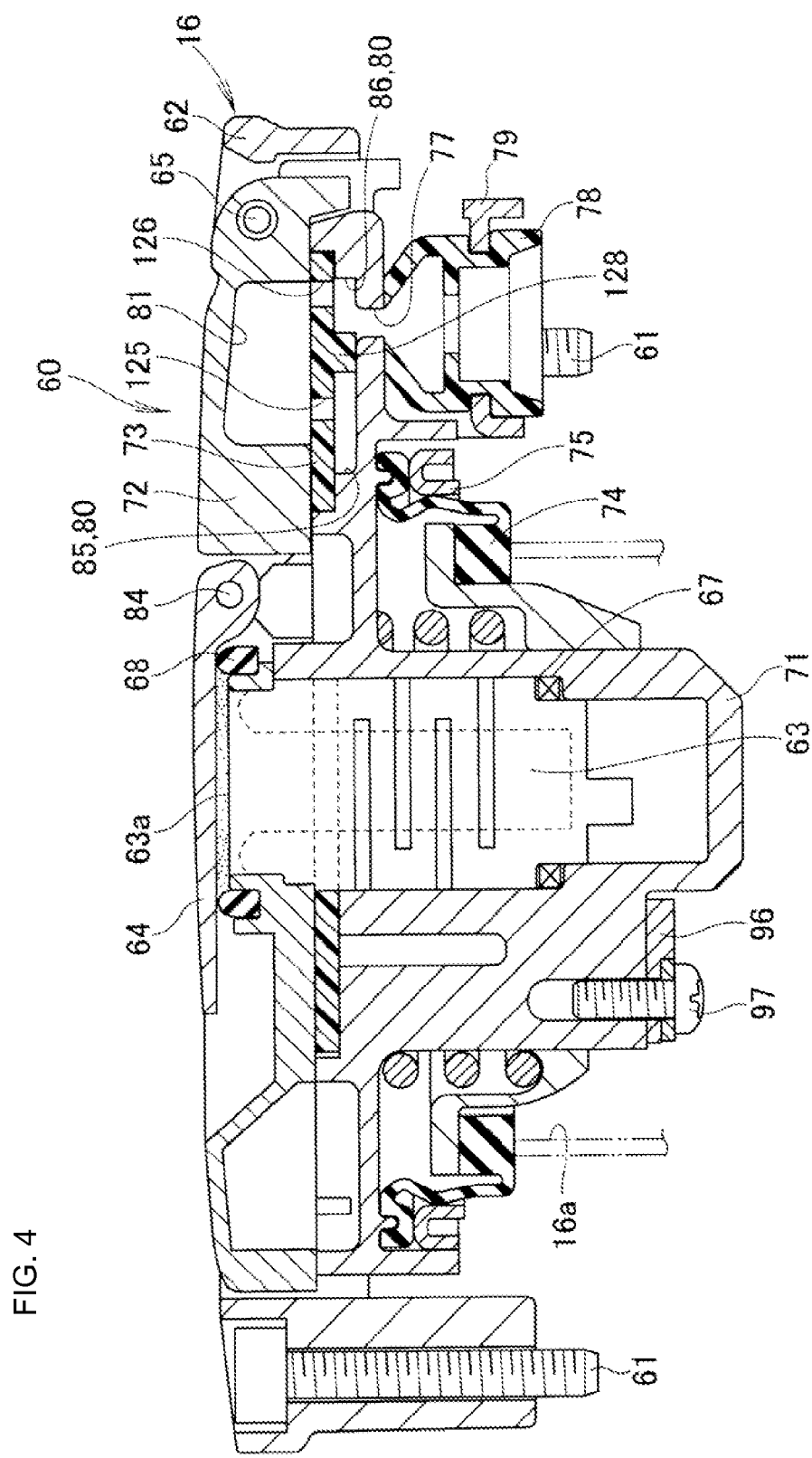
FIG. 4 is a sectional view taken along a line 4-4 of FIG. 3.
Figure 5:
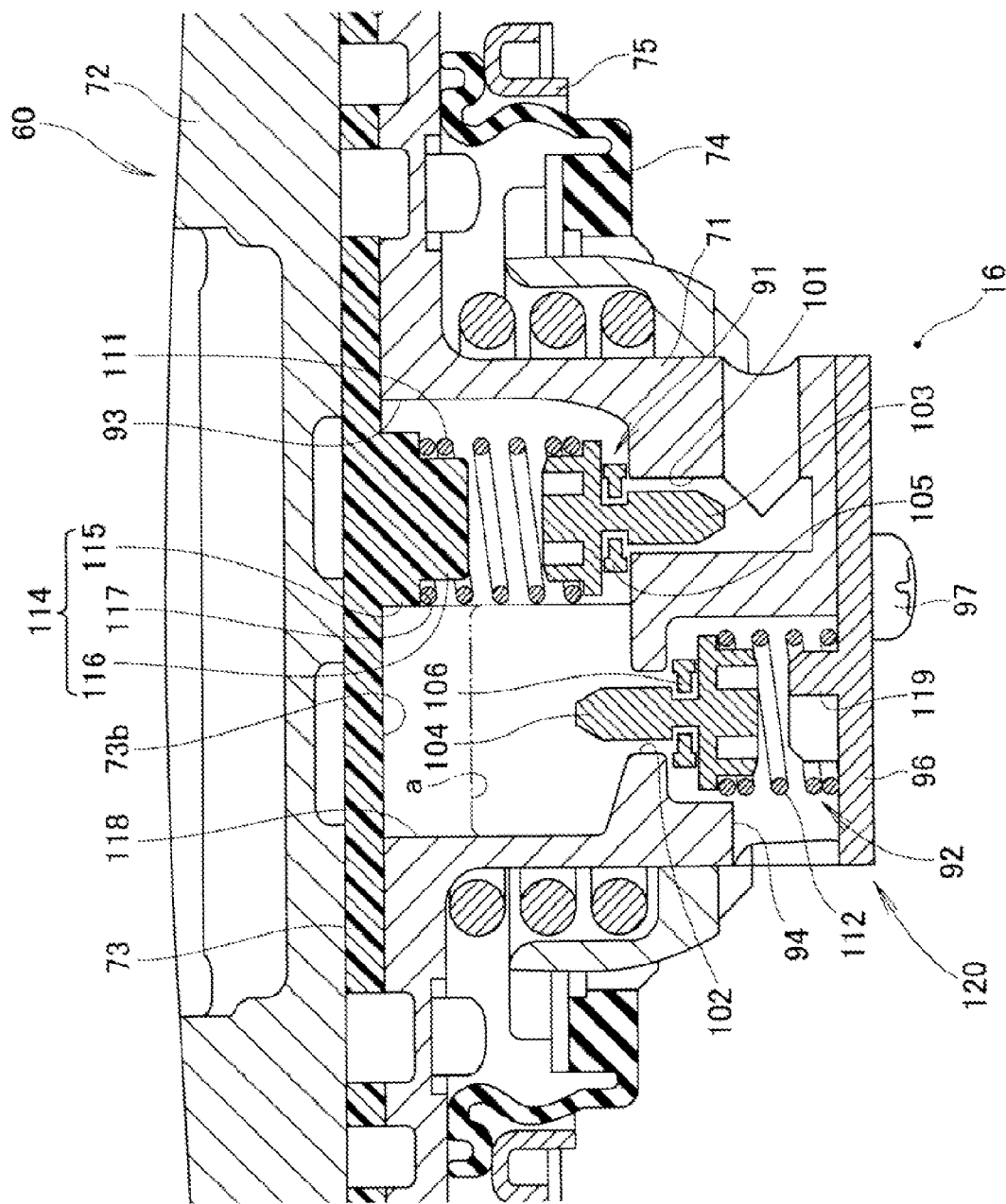
FIG. 5 is a sectional view taken along a line 5-5 of FIG. 3.

Referring to FIGS. 4 and 5, description will next be made of details of a structure of the fuel cap 60 and the like.

As shown in FIG. 4, the cap ring 62 attached to the side of the fuel tank 16 turnably supports the fuel cap 60 (fuel cap 60 provided with a breather mechanism) via a shaft member 65. In the figure, the fuel cap 60 is located in such a position as to cover the fuel filler 16a.

The fuel cap 60 includes a lower body 71 provided integrally with the key cylinder 63 into which to insert a key and an upper body 72 attached to the lower body 71 from above. A seal member 73 is interposed between the lower body 71 and the upper body 72.

A cap seal 74 that abuts against the fuel filler 16a when the fuel cap 60 is closed is attached to the lower body 71. A ring-shaped retaining member 75 for retaining the cap seal 74 in the lower body 71 is fitted in the vicinity of an outer circumference of the cap seal 74.

Description will next be made of a breather system for ventilation. A breather hole 77 as an opening opened to the air is provided in an end portion of the lower body 71 of the fuel cap 60. The breather hole 77 communicates with a breather passage 80. A breather seal is provided to a seal holder 79 of the cap ring 62. The breather seal 78 is disposed in such a position as to abut against the breather hole 77 when the fuel cap 60 is closed. The breather seal 78 can communicate with the air. The breather seal 78 is formed by an elastic member.

An upper surface 63a of the key cylinder 63 is exposed to the upper body 72. A lock hole 83 (see FIG. 6) into which the key not shown in the figure can be inserted from above is provided in the upper surface 63a. The key cylinder cover 64 for openably and closably covering the lock hole 83 is attached via a pin 84. The lock hole 83 (see FIG. 6) is a hole into which the key not shown in the figure is inserted from above, the key being then turned to lock or unlock the fuel cap 60 to or from the fuel tank 16. A cylinder seal 67 is interposed between a lower portion of the lower body 71 and the key cylinder 63. A dust seal 68 is interposed between the periphery of an upper end of the lower body 71 and the key cylinder 63.

As shown in FIG. 5, the fuel cap 60 has two valves that, when a predetermined pressure difference occurs between the inside and the outside of the fuel tank, are opened and thereby enable ventilation so as to eliminate the pressure difference. These two valves are formed by a positive pressure valve 91 provided in a positive pressure valve chamber 93 as a space and a negative pressure valve 92 provided in a negative pressure valve chamber 94 as a space.

The positive pressure valve 91 is actuated by a pressure within the fuel tank to release a gas within the fuel tank 16 to the atmosphere when the pressure inside the fuel tank 16 becomes higher than the pressure of the atmosphere by a predetermined value or more. The negative pressure valve 92 is actuated by atmospheric pressure to guide the atmosphere into the fuel tank 16 when the pressure inside the fuel tank 16 becomes lower than the pressure of the atmosphere by a predetermined value or more.

The positive pressure valve 91 and the negative pressure valve 92 are provided respectively in the positive pressure valve chamber 93 and the negative pressure valve chamber 94 formed in the lower body 71. A plate-shaped valve cover 96 for supporting the negative pressure valve 92 is attached to a lower surface of the lower body 71 via a screw member 97.

The positive pressure valve 91 is inserted and set from above into a first hole 101 made in the positive pressure valve chamber 93. The positive pressure valve includes a first valve piece 103 and a first valve seal 105 that can open and close the first hole 101 and a first spring 111 interposed between the first valve piece 103 and an engaging projecting portion 114 projected downward from the seal member 73, the first spring 111 normally pressing the first valve piece 103 from the outside of the fuel tank 16 so as to close the first hole 101. The positive pressure valve 91 of a breather valve mechanism 120 has the first spring 111 that can retain the internal pressure of the fuel tank 16 up to a predetermined pressure.

The engaging projecting portion 114 includes a cylindrical base portion 115 projecting downward from a lower surface 73b of the seal member 73 and a cylindrical engaging portion 116 having a smaller outside diameter than that of the base portion 115 and projecting downward from the base portion 115, the first spring 111 being engaged with the engaging portion 116. An abutting surface 117 at a right angle to an expansion and contraction direction of the first spring 111 is formed on the base portion 115 at the base of the engaging portion 116.

The negative pressure valve 92 is inserted and set from below into a second hole 102 made in the negative pressure valve chamber 94. The negative pressure valve 92 includes a second valve piece 104 and a second valve seal 106 that can open and close the second hole 102 and a second spring 112 interposed between the second valve piece 104 and the valve cover 96, the second spring 112 pressing the second valve piece 104 from the inside of the fuel tank 16 so as to close the second hole 102. A spring positioning projecting portion 119 for positioning the second spring 112 is formed on the valve cover 96.

A communicating space 118 communicating with the positive pressure valve chamber 93 is formed above the negative pressure valve chamber 94 and above the second hole 102. As indicated by a phantom line a in FIG. 5, the communicating space 118 changes in volume, whereby a resonance action can be produced in a resonator chamber 81 effectively.

Figure 6:
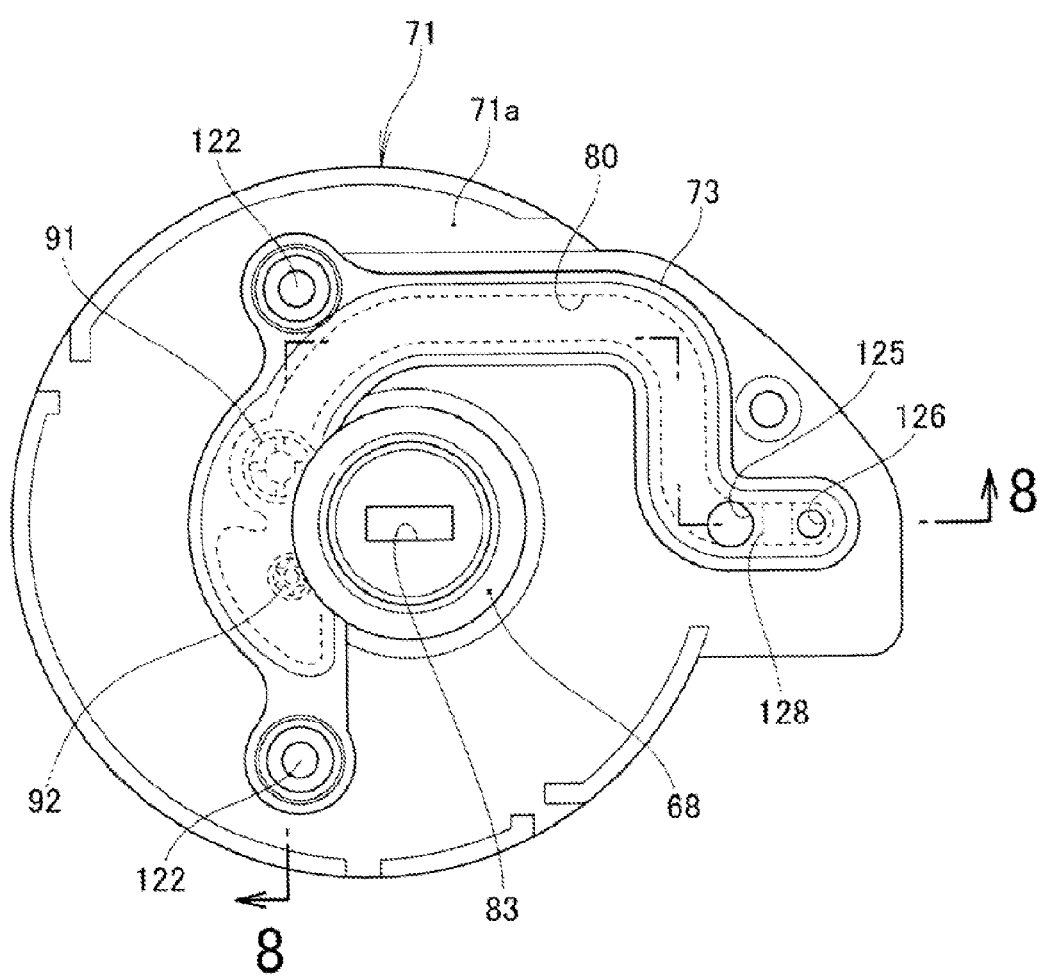
FIG. 6 is a plan view of assistance in explaining covering a breather passage formed in a lower body with a seal member.
Figure 7:
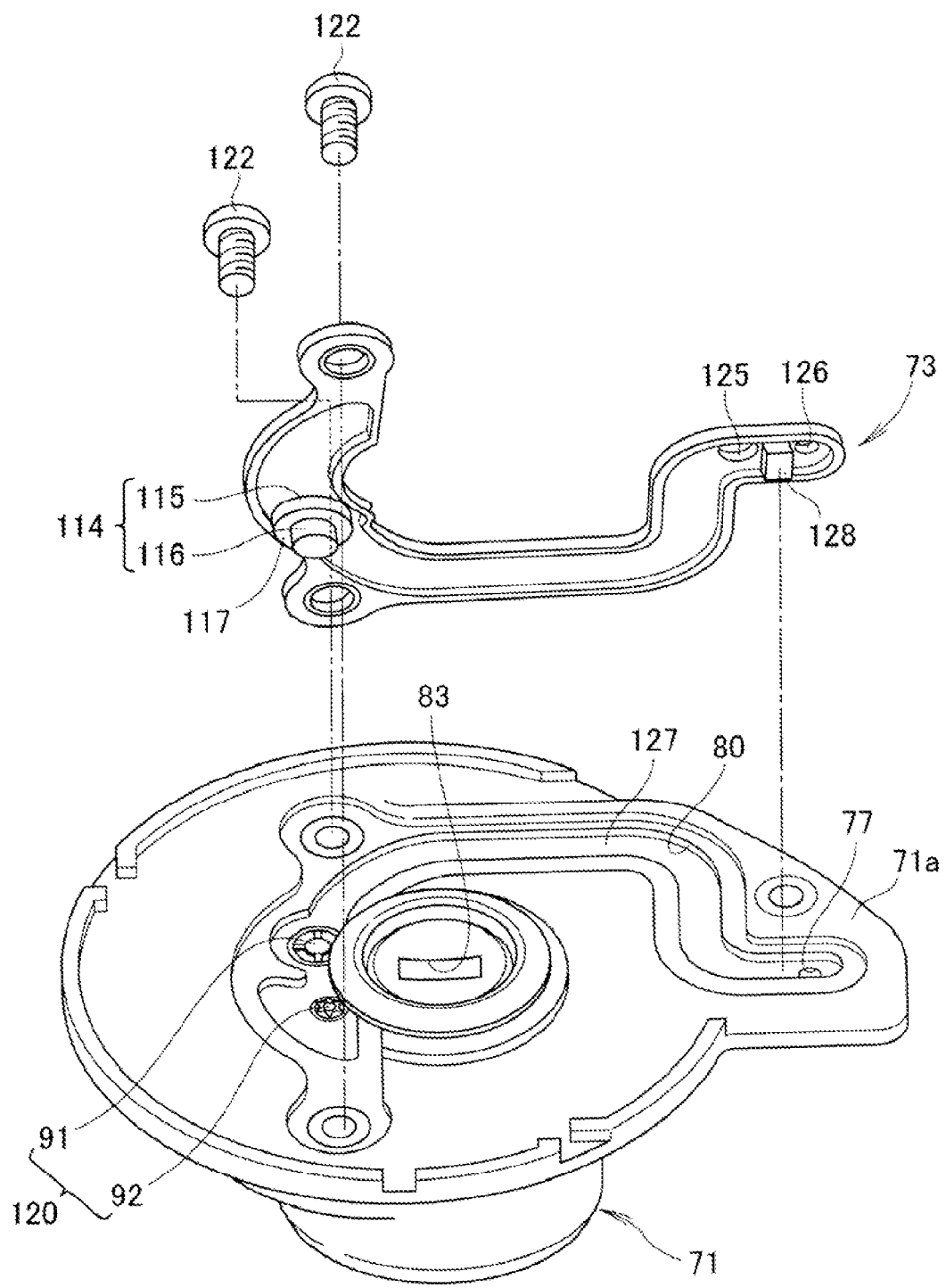
FIG. 7 is an exploded perspective view of assistance in explaining covering the breather passage formed in the lower body with the seal member.
Figure 8:
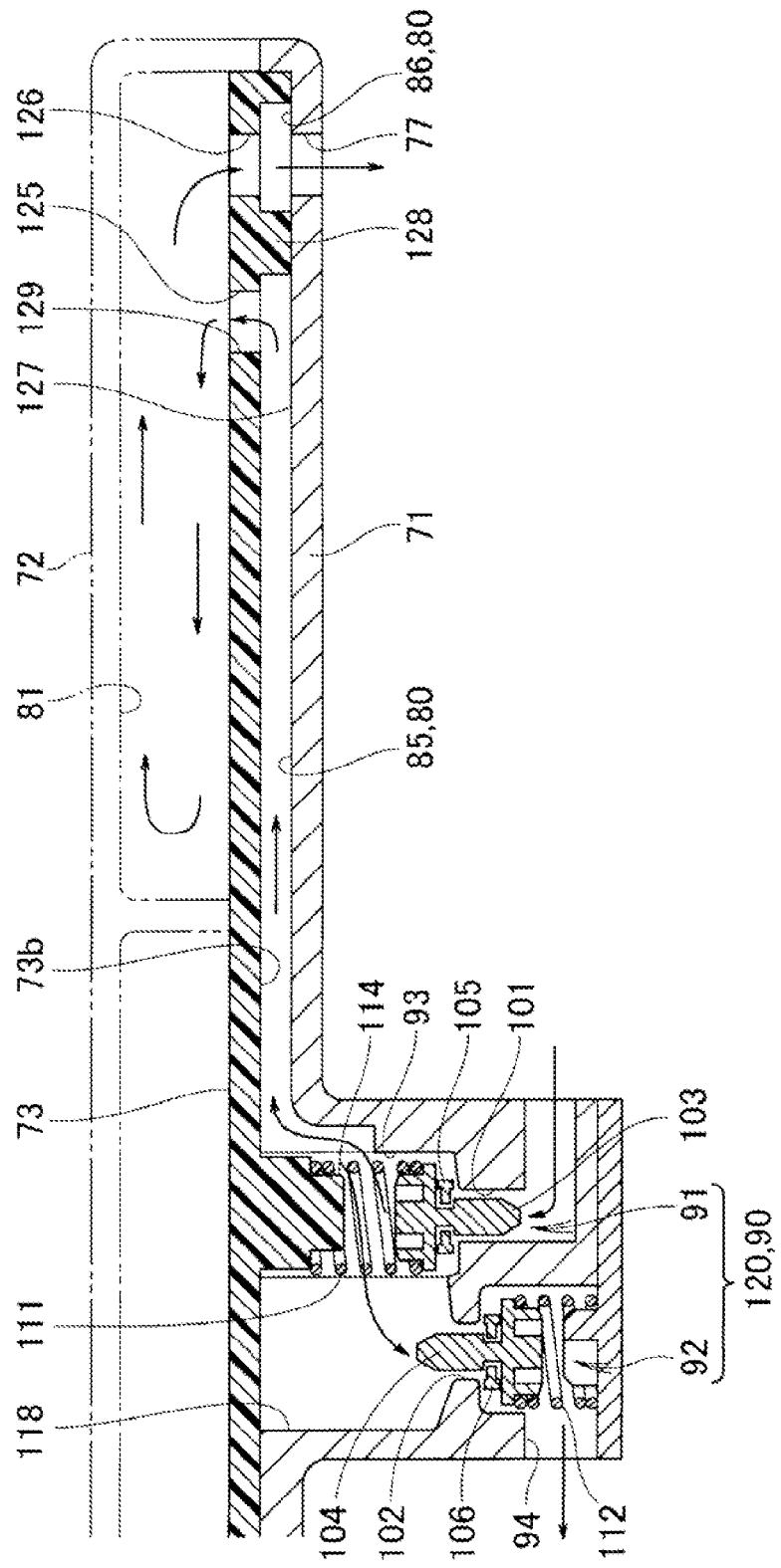
FIG. 8 is a sectional view taken along a line 8-8 of FIG. 6 (developed view of the breather passage).

Referring to FIGS. 6 to 8, description will next be made of details of a structure of the breather passage 80 formed within the fuel cap 60 to make the inside and the outside of the fuel tank 16 communicate with each other and a peripheral portion of the breather passage 80.

FIG. 6 is a plan view when the upper body 72 in FIG. 5 is removed. FIG. 7 is an exploded perspective view of FIG. 6.

As shown in FIGS. 6 and 7, the breather passage having substantially the shape of a U as viewed in plan and formed in the shape of a groove is formed in an upper surface 71a of the lower body 71, and the seal member 73 is attached from above so as to cover the breather passage 80. That is, the breather passage 80 is covered by the seal member 73. The seal member 73 is formed in substantially the shape of a U as viewed in plan so as to conform to the shape of the breather passage 80 having substantially the shape of a U.

The seal member 73 is attached to the lower body 71 via fastening portions 122 annexed to the side of the lower body 71 at both ends in the vehicle width direction. Incidentally, while the seal member 73 is attached to the lower body 71 in the present embodiment, the seal member 73 may be attached to the upper body 72.

Detailed description will next be made of the breather passage 80, the resonator chamber 81, and the like.

As shown in FIG. 8, in the lower body 71, a breather valve mechanism 120 including the positive pressure valve 91 and the negative pressure valve 92 is provided at one end of the breather passage 80. The breather passage 80 extending from the breather valve mechanism 120 is formed between the lower body 71 and the seal member 73, and is also formed between the seal member 73 and the upper body 72. A resonator chamber 81 as a silencing mechanism branching from the breather passage 80 is formed between the seal member 73 and the upper body 72. A part of the resonator chamber 81 serves also as the breather passage 80.

Specifically, a first breather passage 85 extends from the first hole 101 of the first valve (positive pressure valve 91) and the second hole 102 of the second valve (negative pressure valve 92). A first communicating hole 125 and a second communicating hole 126 are provided on another end side of the first breather passage 85. A second breather passage 86 is provided at a position farther than the second communicating hole 126. The breather hole 77 is provided to the second breather passage 86. The resonator chamber is provided at a position farther than the first communicating hole 125. The resonator chamber 81 is formed between seal member 73 and the upper body 72.

The breather passage (first breather passage 85) before branching into the resonator chamber 81 is formed in the lower body 71 below the resonator chamber 81. Specifically, the first breather passage 85 is formed between the lower body 71, the lower surface 73b of the seal member 73, and a projecting portion 128 projected downward from the lower surface 73b and abutting against a groove bottom portion 127 of the lower body 71. The projecting portion 128 projects downward from the seal member 73 between the first communicating hole 125 and the second communicating hole 126.

The resonator chamber 81 and a branching portion 129 branching from the breather passage 80 into the resonator chamber 81 are formed at a same height as the resonator chamber 81 in the upper body 72. In addition, the breather passage (second breather passage 86) after branching from the resonator chamber 81 is formed in the lower body 71 below the resonator chamber 81. That is, the breather passage (first breather passage 85) before branching and the breather passage (second breather passage 86) after branching form a bypassing shape vertically bypassing the projecting portion 128 formed on the seal member 73.

Description will next be made of the shape of a passage making a connection from the positive pressure valve to the breather passage.

Figure 9:
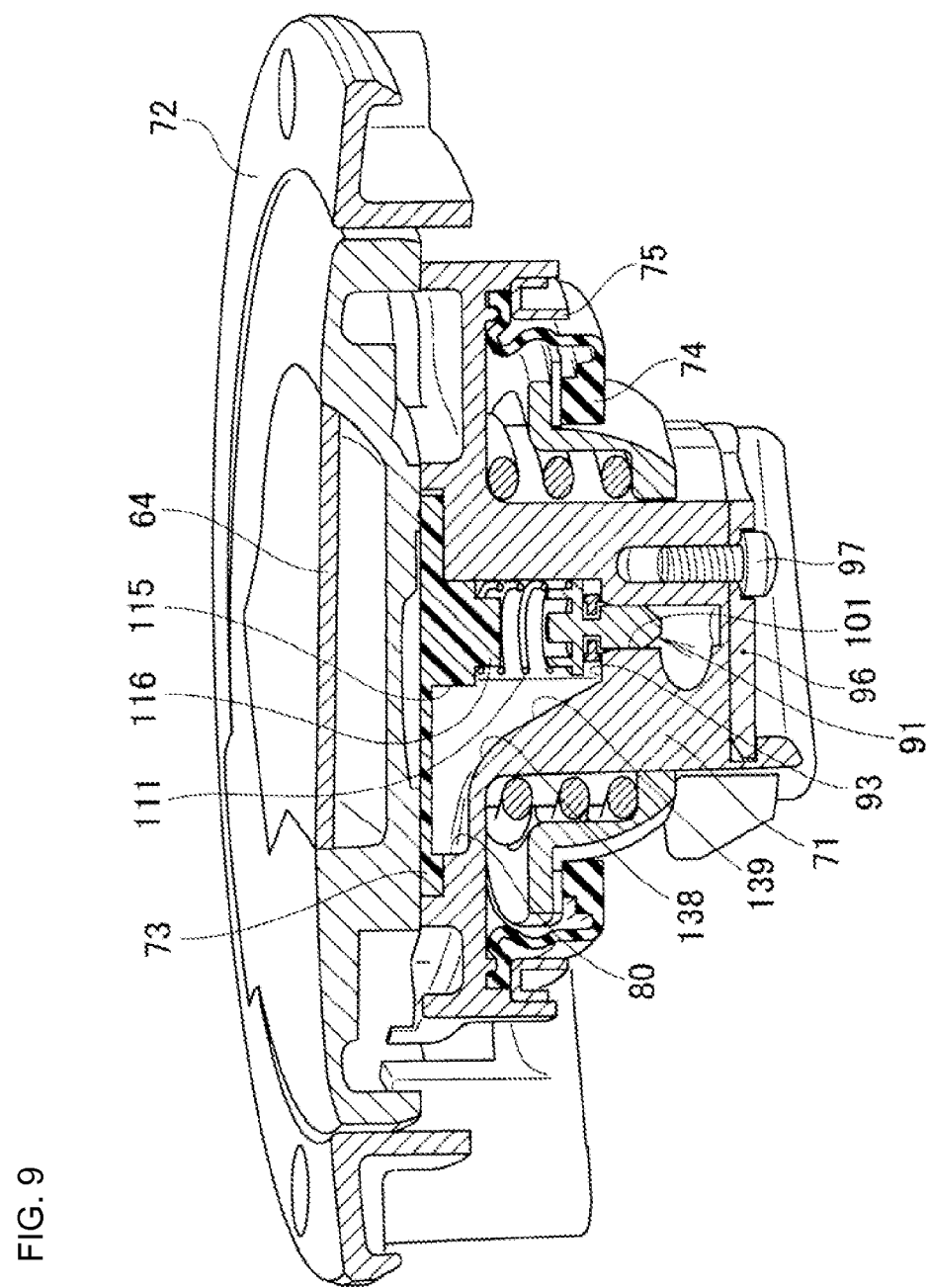
FIG. 9 is a sectional view showing that a passage making a connection from a positive pressure valve to the breather passage is formed in an inclined shape.

As shown in FIG. 9, a passage 138 making the connection from the positive pressure valve 91 to the breather passage 80 is formed in an inclined shape. Specifically, a part that is extended from the first hole 101 of the positive pressure valve chamber 93 formed mainly in the lower body 71 and which part is connected to the breather passage 80 is defined by an inclined wall 139, whereby the passage 138 is formed into an inclined shape.

Returning to FIG. 4, the shaft member 65 that is provided between the fuel tank 16 and the fuel cap 60 provided with the breather mechanism and which shaft member 65 swingably supports the fuel cap 60 provided with the breather mechanism on the fuel tank 16 is disposed in a position overlapping with the resonator chamber 81 in a height direction.

Description will next be made of the structure of the first valve piece 103 as a constituent element of the valve.

Figure 10:
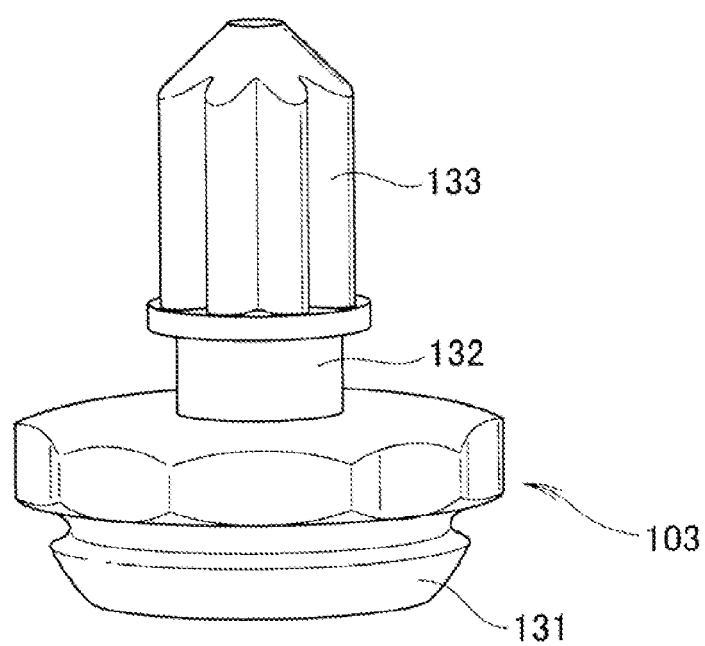
FIG. 10 is a side view of a valve piece.

As shown in FIG. 10, the first valve piece 103 includes a flange portion 131 engaged with the spring 111 (see FIG. 8), and pressed by the spring 111. A column portion 132 extends from the flange portion 131 in the height direction, and a vane portion 133 is formed on a front end portion of the column portion 132. The tip end of the valve (valve piece 103) has a shape of eight vanes.

In the present embodiment, the number of vanes of the tip end is eight. The tip end desirably has a shape of four to 12 vanes. Without being limited to the above numbers, the tip end can be set to an arbitrary number.

The structure of the second valve piece is similar to the described structure of the first valve piece, and therefore description thereof will be omitted.

Description will next be made of the action of the fuel cap provided with the breather mechanism described above.

Returning to FIG. 8, when the inside of the fuel tank 16 has a positive pressure, and the positive pressure becomes a predetermined value or more, the pressure within the tank presses the positive pressure valve 91 against the force of the first spring 111, and opens the positive pressure valve 91, so that a fuel vapor within the fuel tank is vented to the outside of the fuel tank 16. Thereby the pressure within the fuel tank 16 can be lowered.

On the other hand, when the inside of the fuel tank 16 has a negative pressure, and the negative pressure becomes a predetermined value or more, atmospheric pressure presses the negative pressure valve 92 against the force of the second spring 112, and opens the negative pressure valve 92, so that an air (atmosphere) outside the fuel tank 16 is taken into the fuel tank 16. Thereby the pressure within the fuel tank 16 can be raised. Thus, the positive pressure valve 91 and the negative pressure valve 92 for adjusting a pressure difference between the inside and the outside of the fuel tank 16 are provided.

The breather valve mechanism 120 is the valve 90 having the springs 111 and 112 that can retain up to a predetermined pressure. The valve 90 includes the positive pressure valve 91 and the negative pressure valve 92. When the positive pressure valve 91 and the negative pressure valve 92 are provided in the breather passage 80, squeaking becomes a major problem, depending particularly on the shape of the valve 90 and the breather passage 80 extending from the valve 90.

In the present invention, in the fuel cap 60 provided with the positive pressure valve 91 and the negative pressure valve 92, the resonator chamber 81 for eliminating squeaking that occurs when an air passes is annexed to the breather passage 80 extending from the positive pressure valve 91 and the negative pressure valve 92. This resonator chamber 81 can suppress the occurrence of an intake or exhaust sound (squeaking), with a pressure wave of the fuel tank 16 resonating with a pressure wave emitted from the resonator chamber 81, when the fuel tank 16 has a high internal pressure and thus the positive pressure valve 91 is opened.

Further, the breather valve mechanism 120 including the positive pressure valve 91 and the negative pressure valve 92 retains the internal pressure of the fuel tank 16 until the internal pressure of the fuel tank exceeds a predetermined pressure. Therefore, an evaporation of fuel within the fuel tank 16 is suppressed until the predetermined pressure is reached. Consequently, as compared with a fuel cap having a structure that normally allows the inside of the fuel tank to communicate with the atmosphere, an amount of evaporated fuel can be reduced greatly, and thus a load on the environment can be reduced.

The breather valve mechanism 120 is provided at one end of the breather passage 80, and the resonator chamber 81 is provided in the middle of the breather passage 80. Specifically, the resonator chamber 81 is disposed on a side close to an atmosphere side opening (breather hole 77) of the breather passage 80. As compared with a case where the resonator chamber 81 is disposed on a side distant from the atmosphere side opening (breather hole 77), a squeaking is less likely to be emitted when the resonator chamber 81 is disposed on the side close to the atmosphere side opening (breather hole 77). As a result, the intake or exhaust sound can be made less likely to occur.

Further, the breather passage (first breather passage 85) before branching and the resonator chamber 81 are formed so as to be vertically separated from each other with the seal member 73 as a boundary. Because the breather passage (first breather passage 85) and the resonator chamber 81 are formed so as to be vertically separated from each other by using the seal member 73, the shape of the first breather passage 85 can be made simple. Because the shape of the first breather passage 85 becomes simple, an increase in cost of the fuel cap 60 provided with the breather mechanism can be suppressed.

Further, the breather passage 80 before and after branching forms a bypassing shape vertically bypassing the projecting portion 128. Because the breather passage 80 is formed into the shape of a complex labyrinth by the projecting portion 128, a silencing effect can be obtained easily. In addition, because the projecting portion 128 formed on the seal member 73 is used for the bypassing shape, the bypassing shape can be formed easily.

Referring to FIG. 9, the passage 138 making a connection from the positive pressure valve 91 to the breather passage 80 is formed in an inclined shape. By forming the passage 138 into an inclined shape, a sharp change in cross-sectional area of the passage 138 is reduced, so that the occurrence of squeaking can be prevented.

In certain embodiments, the projecting portion 128 is provided to the breather passage 80. However, without being limited to a projecting portion, a complex shape may be formed by providing a recessed portion, for example.

Returning to FIG. 6, the seal member 73 is attached to the lower body 71 at both ends in the vehicle width direction of the seal member 73. When the seal member 73 is attached at both ends of the seal member 73, the accuracy of attachment of the seal member 73 is improved in the vehicle width direction as compared with a case where the seal member 73 is attached at other than both ends of the seal member 73. In addition, the breather passage 80 can be lengthened by providing the breather passage 80 along substantially the shape of the U of the seal member 73. When the breather passage 80 is lengthened, a distance from the breather valve mechanism 120 provided at one end 80a of the breather passage 80 to the atmosphere side opening (breather hole 77) is correspondingly lengthened, so that a squeaking is less likely to be leaked to the outside.

Returning to FIG. 10, the tip end of the valve (valve piece 103) has a shape of four to 12 vanes.

In a case where the tip end of the valve piece has a shape of fewer vanes, that is, less than four vanes, the valve is likely to be affected by a gas flowing through the passage. Similarly, also in a case where the tip end of the valve piece has a shape of more vanes, that is, 13 vanes or more, the valve is likely to be affected by a gas flowing through the passage. When the valve is likely to be affected by a gas, the valve itself is likely to vibrate.

In this respect, the tip end of the valve (valve piece 103) in the present invention has a shape of four to 12 vanes. In this case, a force is equally applied to the valve (valve piece 103) along the axial direction of the valve (valve piece 103). Thus, the attitude of the valve (valve piece 103) is stabilized, and therefore the valve itself is not likely to vibrate. That is, the vibration of the valve (valve piece 103) can be made less likely to occur by setting the number of vanes of the vane shape at four to 12.

Returning to FIG. 4, the shaft member 65 that swingably supports the fuel cap 60 provided with the breather mechanism on the fuel tank 16 overlaps with the resonator chamber 81 in the height direction. Because the shaft member 65 and the resonator chamber 81 overlap with each other in the height direction, the height of the fuel cap 60 provided with the breather mechanism can be suppressed.

As a result, the fuel cap 60 provided with the breather mechanism can be miniaturized.

Figure 11:
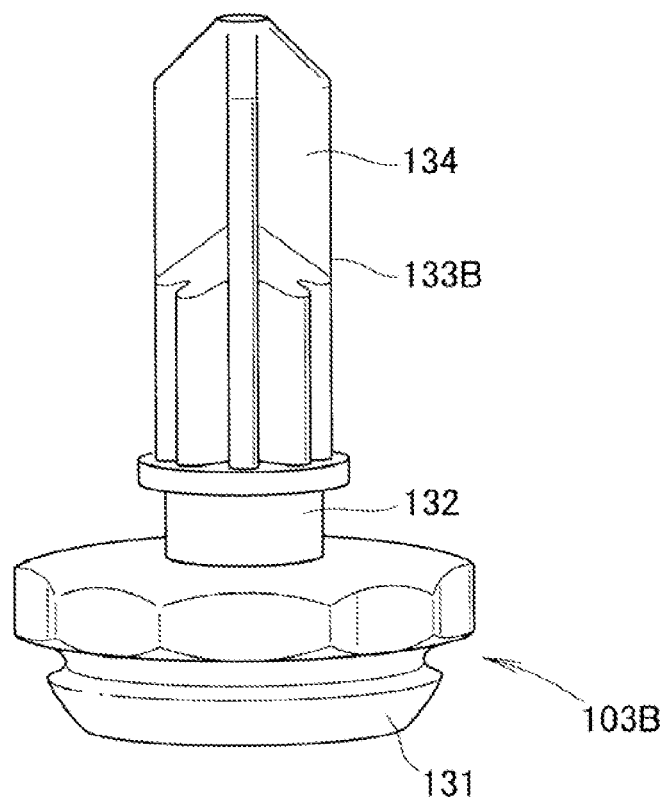
FIG. 11 is a diagram of another embodiment of FIG. 10.
Figure 12:
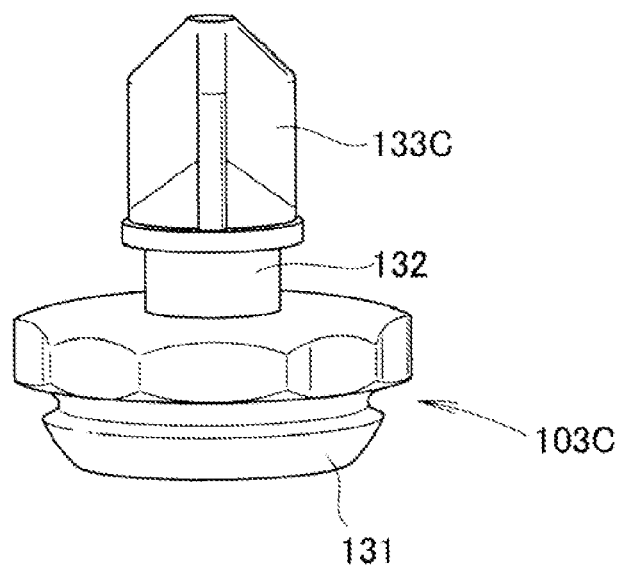
FIG. 12 is a diagram of a modification of FIG. 11.

Referring to FIGS. 11 and 12, description will next be made of valve structures that suppress the occurrence of squeaking with different valve shapes.

As shown in FIG. 11, a first valve piece 103B includes a flange portion 131 engaged with the spring 111 (see FIG. 8), and pressed by the spring 111. A column portion 132 extends from the flange portion 131 in the height direction, and a vane portion 133B is formed on a front end portion of the column portion 132. A difference from the embodiment lies in that a vane portion 134 with four additional vanes is further extended from the tip portion in FIG. 10. Otherwise, there is no large difference from the embodiment, and thus further description will be omitted.

As shown in FIG. 12, a first valve piece 103C includes a flange portion 131, and a column portion 132 extending from the flange portion 131 in the height direction. A vane portion 133C is formed on a front end portion of the column portion 132. A difference from the embodiment lies in that the number of vanes of the tip end is four. Otherwise, there is no large difference from the embodiment, and thus further description will be omitted.

Structures similar to the described structures of the first valve pieces in FIGS. 11 and 12 are applicable to the structure of the second valve piece, and thus description thereof will be omitted.

Description will next be made of suppressing the occurrence of squeaking by changing the structure for supporting the spring that retains the valve.

Figure 13:
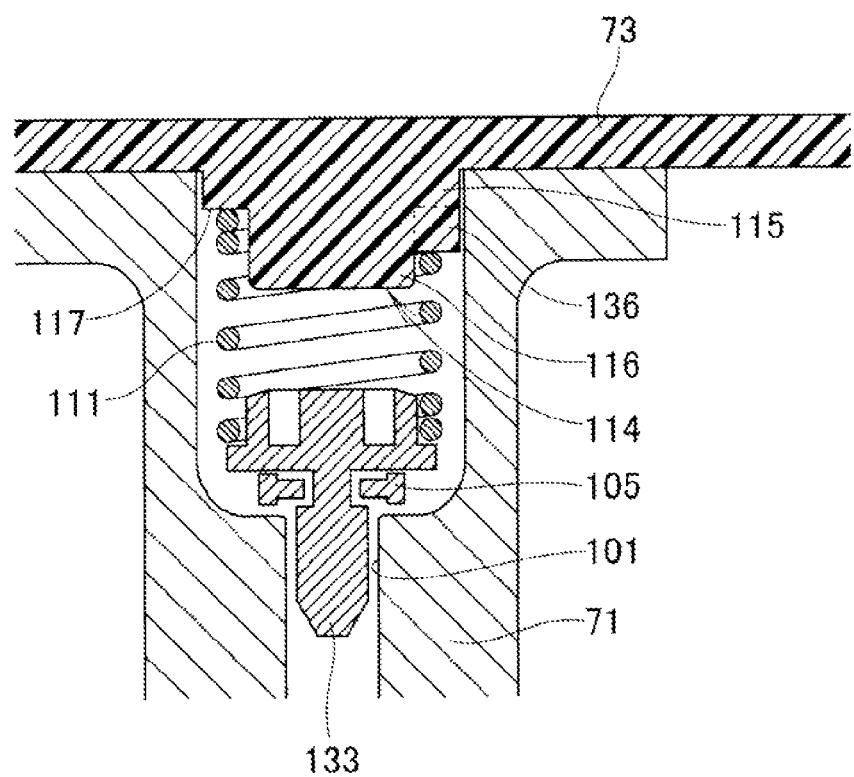
FIG. 13 is a diagram of a modification of a seating surface on which a valve supporting spring in FIG. 8 is set.

As shown in FIG. 13, the engaging projecting portion 114 includes the cylindrical base portion 115 and the cylindrical engaging portion 116 having a smaller outside diameter than the base portion 115 and projecting downward from the base portion 115. The abutting surface 117 as a surface at a right angle to the expansion and contraction direction of the first spring 111 is formed on the base portion 115 at the base of the engaging portion 116. A large difference from the embodiment lies in that an additional thickness 136 is added to a part of the abutting surface 117. Otherwise, there is no large difference from the embodiment.

Because the additional thickness 136 is provided to the abutting surface 117 to incline the abutting surface 117 that the first spring 111 abuts against, a radial displacement of the first valve piece 103 can be reduced, and thus the vibration of the valve piece 103 can be reduced.

In addition, a resonator chamber formed using a seal member has been described in the embodiment of the present invention. However, for example, when a structure in which the upper portion of the breather passage is simply covered by the seal member is formed by closing the communicating holes made in the seal member, and removing the projecting portion obstructing the breather passage, the so-called squeaking can be prevented by vibrating the seal member.

It is to be noted that while the present invention is applied to a motorcycle in the embodiment, the present invention may be applied to vehicles in general.

The present invention is suitable for a vehicle having a fuel cap provided with a breather mechanism.

DESCRIPTION OF REFERENCE SYMBOLS

16 . . . Fuel tank, 16a . . . Fuel filler, 60 . . . Cap, 65 . . . Shaft member, 71 . . . Lower body, 72 . . . Upper body, 73 . . . Seal member, 77 . . . Opening (breather hole) to the atmosphere, 80 . . . Breather passage, 81 . . . Resonator chamber, 90 . . . Valve, 91 . . . Positive pressure valve, 92 . . . Negative pressure valve, 120 . . . Breather valve mechanism, 128 . . . Projecting portion, 129 . . . Branching portion, 138 . . . Passage, 139 . . . Inclined shape (inclined wall).

The invention claimed is:

1. A fuel cap, said fuel cap being configured to openably and closably cover a fuel filler of a fuel tank, said fuel cap comprising:
   a breather valve mechanism having a valve with a spring configured to retain an internal pressure of the fuel tank up to a predetermined pressure; and
   a breather passage configured to communicate between the fuel tank and an atmosphere, said breather passage including the breather valve mechanism and a resonator chamber therein, the breather valve mechanism and resonator chamber forming a silencing mechanism,
   wherein the fuel cap further comprises a lower body and an upper body attached onto the lower body, and the breather passage before branching into the resonator chamber is formed in the lower body below the resonator chamber, and
   wherein the resonator chamber and the breather passage before the branching are formed so as to be vertically separated from each other with a seal member as a boundary.

2. The fuel cap according to claim 1,
   wherein the resonator chamber is disposed on a side closer to an opening to the atmosphere than to the valve in the breather passage.

3. The fuel cap according to claim 1, wherein the fuel cap is configured to be swingably supported on the fuel tank via a shaft member, the shaft member is configured to overlap with the resonator chamber in a height direction.

4. A fuel cap, said fuel cap being configured to openably and closably cover a fuel filler of a fuel tank, said fuel cap comprising:
   a breather valve mechanism having a valve with a spring configured to retain an internal pressure of the fuel tank up to a predetermined pressure; and
   a breather passage configured to communicate between the fuel tank and an atmosphere, said breather passage including the breather valve mechanism and a resonator chamber therein, the breather valve mechanism and resonator chamber forming a silencing mechanism,
   wherein the fuel cap further comprises a lower body and an upper body attached onto the lower body, and the breather passage before branching into the resonator chamber is formed in the lower body below the resonator chamber, wherein the resonator chamber and a branching portion between the resonator chamber and the breather passage are formed at a same height as the resonator chamber in the upper body, and wherein the resonator chamber and the breather passage before the branching are formed so as to be vertically separated from each other with a seal member as a boundary.

5. The fuel cap according to claim 4,
wherein the breather passage before branching and the breather passage after branching form a bypassing shape vertically bypassing at least one of a projecting portion formed on the seal member and a recessed portion.

6. The fuel cap according to claim 4,
wherein the seal member has substantially a shape of a U as viewed in plan, and is attached to the upper body or the lower body at both ends in a vehicle width direction of the seal member.

7. The fuel cap according to claim 1,
wherein the valve includes a positive pressure valve and a negative pressure valve, and is configured such that when the inside of the fuel tank has a positive pressure, the positive pressure valve is opened and the negative pressure valve is closed, and when the inside of the fuel tank has a negative pressure, the positive pressure valve is closed and the negative pressure valve is opened.

8. The fuel cap according to claim 7,
wherein a passage making a connection from the positive pressure valve to the breather passage is formed in an inclined shape.

9. The fuel cap according to claim 1,
wherein a tip end of the valve has a shape of four to twelve vanes.

10. A fuel cap, said fuel cap being configured to openably and closably cover a fuel filler of a fuel tank, said fuel cap comprising:
breather valve means for enabling selective communication between the fuel tank and an atmosphere, said breather valve means including spring means for retaining an internal pressure of the fuel tank up to a predetermined pressure; and
breather passage means for enabling fluid to communicate between the fuel tank and the atmosphere, said breather passage means including the breather valve means and a resonator chamber, said breather valve means and resonator chamber forming silencing means to silence any sounds caused by fluid flowing between the fuel tank and the atmosphere,
wherein the fuel cap further comprises a lower body and an upper body attached to the lower body, wherein the breather passage means before branching into the resonator chamber is formed in the lower body below the resonator chamber, and
wherein the resonator chamber and the breather passage means before the branching are formed so as to be vertically separated from each other with a seal means for forming a boundary between the resonator chamber and the breather passage means.

11. The fuel cap according to claim 10, wherein the resonator chamber is disposed on a side of the breather passage means closer to an opening to the atmosphere than to the valve.

12. The fuel cap according to claim 10, said fuel cap being configured to be swingably supported on the fuel tank via shaft means for swingably supporting the fuel cap, said shaft means overlapping with the resonator chamber in a height direction.

13. A fuel cap, said fuel cap being configured to openably and closably cover a fuel filler of a fuel tank, said fuel cap comprising:
breather valve means for enabling selective communication between the fuel tank and an atmosphere, said breather valve means including spring means for retaining an internal pressure of the fuel tank up to a predetermined pressure; and
breather passage means for enabling fluid to communicate between the fuel tank and the atmosphere, said breather passage means including the breather valve means and a resonator chamber, said breather valve means and resonator chamber forming silencing means to silence any sounds caused by fluid flowing between the fuel tank and the atmosphere,
wherein the fuel cap further comprises a lower body and an upper body attached to the lower body, wherein the breather passage means before branching into the resonator chamber is formed in the lower body below the resonator chamber,
wherein the resonator chamber and a branching portion between the resonator chamber and the breather passage means are formed at a same height as the resonator chamber in the upper body, and
wherein the resonator chamber and the breather passage means before the branching are formed so as to be vertically separated from each other with a seal means for forming a boundary between the resonator chamber and the breather passage means.

14. The fuel cap according to claim 13, wherein the breather passage means before branching and the breather passage means after branching form a bypassing shape vertically bypassing at least one of a projecting portion formed on the seal means and a recessed portion.

15. The fuel cap according to claim 13, wherein the seal means has a substantially U-shape as viewed in plan, and is attached to the upper body or the lower body at both ends in a vehicle width direction of the seal means.

16. The fuel cap according to claim 10, wherein the valve means includes positive pressure valve means and negative pressure valve means, the positive pressure valve means for opening when an inside of the fuel tank has a positive pressure, and the negative valve means for closing when the inside of the fuel tank has the positive pressure, and the positive pressure valve means for closing when the inside of the fuel tank has a negative pressure, and the negative pressure valve means for opening when the inside of the fuel tank has a negative pressure.

17. The fuel cap according to claim 16, further comprising passage means for making a connection from the positive pressure valve means to the breather passage means, said passage means being formed in an inclined shape.

18. The fuel cap according to claim 10, wherein a tip end of the valve means has a shape of four to twelve vanes.

* * * * *